United States Patent
Kerber et al.

(10) Patent No.: US 8,279,751 B2
(45) Date of Patent: Oct. 2, 2012

(54) SYSTEM AND METHOD FOR SIGNAL FAILURE DETECTION IN A RING BUS SYSTEM

(75) Inventors: Stefan Kerber, Straubenhardt (DE); Robert Wilhelm, Ettlingen (DE)

(73) Assignee: SMSC Europe GmbH, Karlsruhe (DE)

( * ) Notice: Subject to any disclaimer, the term of this patent is extended or adjusted under 35 U.S.C. 154(b) by 307 days.

(21) Appl. No.: 12/752,291

(22) Filed: Apr. 1, 2010

(65) Prior Publication Data

US 2010/0246408 A1  Sep. 30, 2010

Related U.S. Application Data

(63) Continuation of application No. PCT/EP2008/063133, filed on Oct. 1, 2008.

(30) Foreign Application Priority Data

Oct. 2, 2007 (EP) .................................. 07117712

(51) Int. Cl.
  *G06F 11/07* (2006.01)
  *H04L 12/42* (2006.01)
(52) U.S. Cl. .................. 370/222; 370/242; 370/252
(58) Field of Classification Search .............. 370/216, 370/222–223, 242, 244–245, 252, 404–406, 370/241, 254; 714/712–717
See application file for complete search history.

(56) References Cited

U.S. PATENT DOCUMENTS

| | | | | |
|---|---|---|---|---|
| 5,282,200 A * | 1/1994 | Dempsey et al. | ............. | 370/245 |
| 5,394,401 A | 2/1995 | Patrick et al. | | |
| 6,816,461 B1 * | 11/2004 | Scrandis et al. | ............. | 370/242 |
| 7,023,796 B2 * | 4/2006 | De Girolamo et al. | ....... | 370/222 |
| 7,167,443 B1 * | 1/2007 | Dantu et al. | ................... | 370/218 |
| 7,355,965 B2 * | 4/2008 | Griswold et al. | ............. | 370/216 |
| 7,512,140 B2 * | 3/2009 | Mutoh et al. | ................... | 370/404 |
| 7,664,052 B2 * | 2/2010 | Oku et al. | ...................... | 370/254 |
| 7,808,931 B2 * | 10/2010 | Zelig et al. | ..................... | 370/258 |
| 7,898,942 B2 * | 3/2011 | Takagi et al. | ................. | 370/222 |
| 2001/0015979 A1 * | 8/2001 | Hata et al. | ..................... | 370/403 |
| 2006/0026471 A1 | 2/2006 | Kubota et al. | | |
| 2006/0215546 A1 * | 9/2006 | Tochio | ........................... | 370/218 |
| 2007/0237072 A1 * | 10/2007 | Scholl | ........................... | 370/222 |
| 2007/0274208 A1 * | 11/2007 | Harter et al. | ................. | 370/223 |

FOREIGN PATENT DOCUMENTS

| | | |
|---|---|---|
| EP | 0431635 | 6/1991 |
| WO | 99/12313 | 3/1999 |

OTHER PUBLICATIONS

International Search Report and Written Opinion, PCT/EP2008/063133, mailed Jan. 23, 2009.

* cited by examiner

*Primary Examiner* — Kwang B Yao
*Assistant Examiner* — Candal Elpenord
(74) *Attorney, Agent, or Firm* — Kevin L. Daffer; Daffer McDaniel, LLP

(57) ABSTRACT

A communication system, network node, and communication port architecture are provided for transporting data across a ring network. If a network node detects a signal failure, the communication port of the network node configures itself as timing master and communicates a shutdown command to the other network nodes. In addition, the communication port sets an internal flag signaling this "signal off" event. All other network nodes, which receive the shutdown flag, do not set this internal status, and instead, save a status of "no fault saved." Accordingly, it can be easily determined where the loss of signal occurred.

12 Claims, 2 Drawing Sheets

SYSTEM AND METHOD FOR SIGNAL FAILURE DETECTION IN A RING BUS SYSTEM

PRIORITY CLAIM

This application is a continuation of pending International Application No. PCT/EP2008/063133 filed Oct. 1, 2008, which designates the United States and claims priority to European Patent Application No. EP 07117712.5 filed Oct. 2, 2007.

BACKGROUND OF THE INVENTION

1. Field of the Invention

The invention relates to a communication system, ports of the communication system and a method for managing a communication system, all based on a ring network of two or more ports coupled preferably in daisy chain fashion to one another to allow communication.

2. Description of Relevant Art

The following descriptions and examples are given as background only.

A communication system is generally known as a system that permits communication between nodes interconnected by a transmission line. Each node can transmit information and receive information across the transmission line. The communication system of interconnected nodes can be organized in various topologies, such as bus, ring, star, or tree topology, or a combination thereof.

A bus topology network is generally regarded as linear. Transmissions from one node propagate along the transmission line and are received by all other nodes connected to that bus. A ring topology network, however, generally consists of a series of nodes connected to one another by unidirectional transmission links to form a single, closed loop. Examples of a ring network (also referred to as ring bus) are described in IEEE 802.5, Fiber Distributed Data Interface (FDDI) and the Media Oriented Systems Transport (MOST) specification.

The transmission line between nodes can be either wired or wireless, for example, copper wire, fiber optic, or wireless transmission medium for the chosen transmission line, respectively.

In ring bus systems, failure of a single node leads to failure of the entire network. For fault clearance, the failing node must be identified. If the fault can be identified by the controller of the failing node, it may be written into memory for later analysis. This is not possible, if the controller itself or other hardware, which cannot be monitored by the controller, fails. Such hardware may be the optical transmitter of an optical network.

U.S. Pat. No. 5,394,401 discloses a ring network based on a smart wiring concentrator or Multi-station Access Unit (MAU) to which individual network nodes are connected. Failure of a single node is detected by a controller. This solution requires a star wiring scheme from each node to the MAU. Furthermore the MAU requires one network port for each attached node, which makes this solution complex and expensive.

WO 99/12313 A discloses a local communication system and apparatus for use therein. This communication system detects bus failures and transmits a shutdown command to succeeding bus nodes.

US 2006/0026471 discloses a loop status monitoring apparatus which identifies failing devices in a network and stores information about these failing devices.

EP 0431635 discloses a ring type LAN having a fault processing system which activates loop-back circuits for the case a node fault has been detected.

SUMMARY OF THE INVENTION

The following description of various embodiments of communication system, network nodes, communication ports and methods of handling a bus failure in a communication system and furthermore identifying the failed bus node is not to be construed in any way as limiting the subject matter of the appended claims.

In one embodiment, a communication system is provided having a plurality of network nodes connected together via a bus, wherein each node comprises a communication port having an input for receiving data, an output for transmitting data and means for detecting a signal off condition at the input. For clarity reasons, reference is made herein to bus nodes (alternatively referred to as "network nodes" or simply "nodes") and to communication ports. Each bus node contains at least one communication port, and in some embodiments, preferably one communication port.

In one embodiment, the plurality of nodes may be connected together via a ring bus network. In such an embodiment, each communication port in a bus node may receive data from a ring bus and transmit data onto the ring bus. Preferably, the bus is an optical ring bus, and the communication network and methods described herein are specifically configured for detecting failures of an optical transmitter within a communication port, and other failures such as line breaks.

When communication has been interrupted and a "signal off" status has been detected, the communication port notifies all other nodes of a failure in the bus. The communication port, which first detects the "signal off" event, is configured as timing master, saves a "signal off" status, switches its output signal off and sends a shutdown flag over the bus. When the shutdown flag is detected by a succeeding node, the succeeding node saves a "no fault saved" status, turns its output signal off, and transmits the shutdown flag to the next node. In this manner, the shutdown process propagates from node to node through the whole bus system. As a further alternative, the shutdown flag may be used to trigger a shutdown of further bus nodes.

Preferably, the communication port checks whether a shutdown flag has been received from the communication port of another node after a "signal off" status is detected. If a shutdown flag has been received, the communication port saves its internal status "no fault saved" and switches off its output signal, thus bringing the communication port into a safe state. If a shutdown flag has not been received, the communication port starts with the procedure described above in which the communication port is configured as the timing master.

In general, the internal status is preferably stored in a non-volatile memory and may be queried after the next restart of the network or power-on of the bus node. The status information is used for distinguishing whether a particular communication port was or was not the first port after the location where a bus fault occurred.

Another embodiment relates to the case in which the network is shut down by a network node, called the power master. In such an embodiment, the communication port of the power master node sets the shutdown flag, forwards the shutdown command to other network nodes, and saves its internal status as "no fault saved". After waiting a predetermined amount of time, which is necessary to forward the frames containing the shutdown flag to the other network nodes, the communication port of the power master switches off its output signal. When the next communication port detects this "signal off" status, it proceeds, as described above for the case in which a shutdown flag is received, by saving its internal status as "no fault saved" and shutting its output off. In this manner, each communication port shuts down one after the other. After a shutdown triggered by the power master, all communication ports have the status "no fault saved."

According to a further embodiment, in the case of an emergency shutdown, which may be caused by a low supply voltage or an over-temperature detected at the communication port, the signal at the output of the communication port is switched off immediately. This causes the succeeding communication port on the bus to detect a "signal off" state and to proceed as explained above by taking over the role as timing master, forwarding the shutdown flag to other network node's communication ports and saving its internal state of "sudden signal off."

The communication port, which is first to detect the "signal off" event, sets the shutdown flag and forwards the shutdown flag to other nodes in the network in a standard frame, a special frame or a message. In one embodiment, frames comprise at least a preamble for marking the beginning of a frame and a shutdown flag field. In some embodiments, the frames may also include an optional data field.

Preferably, transmitting and receiving of the shutdown flag is performed by the physical layer (according to the ISO model) of the communication port.

Additional embodiments of the invention include a network node comprising at least one of the previously disclosed communication ports and a method for shutting down a communication port of a network node, a network node, or even a whole network.

BRIEF DESCRIPTION OF THE DRAWINGS

In the following, the invention will be described by way of example, without limitation of the general inventive concept, on examples of embodiment and with reference to the drawings.

Figure 1:
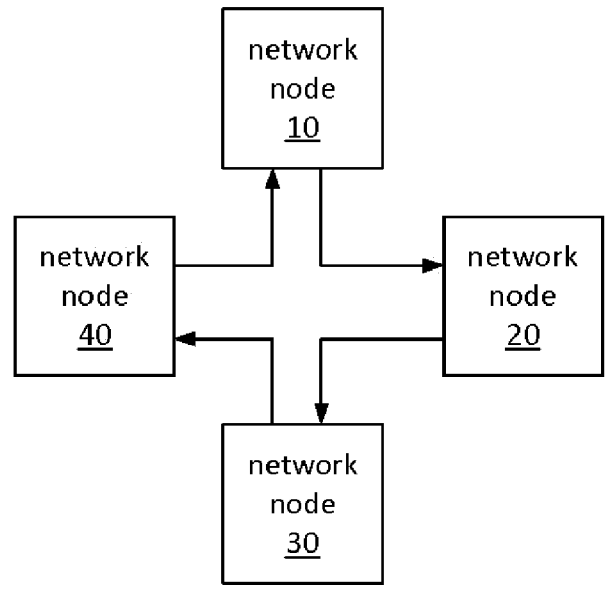
FIG. 1 is a block diagram illustrating one embodiment of a ring bus network comprising four network nodes.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

FIG. 1 shows a ring network comprising four network nodes. A first network node 10, a second network node 20, a third network node 30 and a fourth network node 40 are connected together to form a ring bus. Data is transferred in the direction of the arrows from first network node 10 to second network node 20 over third network node 30 and fourth network node 40 back to first network node 10.

Figure 2:
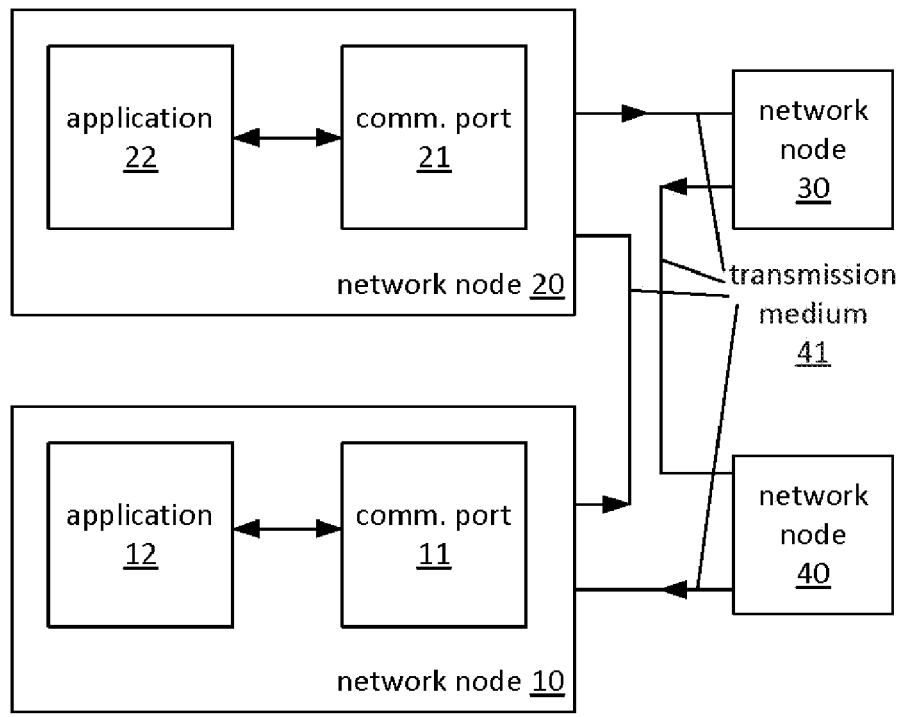
FIG. 2 is a block diagram of the ring bus network of FIG. 1, illustrating network nodes 10 and 20 in more detail.

FIG. 2 shows a ring bus as in FIG. 1, where the network nodes 10 and 20 are shown in more detail. The first and second network nodes 10 and 20 include communication ports, 11 and 21, respectively, which receive data from the network and send data over the network. Furthermore, the communication ports 11, 21 exchange data with the application 12, 22 of the network node. All network nodes are connected via the data bus lines 41.

In one embodiment, a communication port 11 in a bus node 10 receives data from a ring bus and transmits data onto the ring bus. During normal operation mode, the communication port continuously receives data transmitted over the ring bus. In some cases, the signal transmission may be interrupted, e.g., by a failure in the bus transmission medium or by a failure in another bus node 40, resulting in a "signal off" status. The communication port 11 can detect a "signal off" status caused by a preceding bus node 40, or the transmission medium 41 in between the preceding bus node 40 and the communication port 11. In most cases, the communication port 11 may have at least one means for detecting a "signal off" status, wherein such means include, but are not limited to, a signal level detector, a lock detector of an internal phase-locked loop (PLL), a frame- or CRC-checker on the incoming data stream or any other means for detecting the loss of input signal. In addition to a bus node or transmission medium failure, a "signal off" status may be generated in response to any other condition where the communication between nodes or communication ports is interrupted, like in a "critical unlock," which is a series of unlock events where communication ports cannot lock onto the data stream of the bus.

When a "signal off" status has been detected, the communication port 11 notifies all other bus nodes that a failure has been detected in the bus between the preceding bus node 40 and the communication port 11. The notification of a bus failure may be conducted as follows.

In order to maintain communication, the communication port is preferably configured as timing master, so that the communication port may serve as timing reference for any further communication over the bus. Once this is achieved, the communication port sets the shutdown flag and sends it over the bus. This shutdown flag is a flag, which is represented by at least one bit (or a plurality of bits) in the network frames sent over the bus. After setting the shutdown flag, the communication port will wait for a predetermined amount of time, which is necessary to distribute the frames containing the shutdown flag to the communication ports of the other network nodes. As used herein, the predetermined amount of time may refer to the time needed to forward a frame containing the shutdown flag to the next subsequent node, or alternatively, to all network nodes in sequence. This time is typically in a range of about 10 ms to about 1 s, and preferably, between a range of about 100 ms to about 200 ms. As an alternative, this time may be zero. The communication port may transmit the shutdown flag in a standard frame, or alternatively, in specific frames or specific messages, which may be sent over the bus for this purpose. In addition to the aforementioned steps, the communication port 11 switches its output signal off (e.g., by disabling an optical output or setting an electrical output to a predetermined voltage or a high impedance state), and saves its internal status as "signal off."

It is noted that the aforementioned steps, including configuring the communication port as timing master, setting the shutdown flag, forwarding the shutdown flag to the communication port(s) of a subsequent network node, saving the status "signal off", and waiting for a time necessary for the next communication port(s) to receive the shutdown flag, may be performed in a different order. It is only necessary to configure the communication port as timing master and setting the shutdown flag before forwarding the shutdown flag to the other communication ports. Waiting can take place anytime after forwarding the shutdown flag. The steps of disabling its output signal and saving the internal status as "signal off" may take place at any time.

After a communication port of a first node has switched its signal off, the communication port of the succeeding node detects a "signal off" condition and proceeds with the procedure discussed below for the case of a received shutdown flag. In this manner, the shutdown process propagates from node to node through the whole bus system. As a another alternative, the shutdown flag may be used to trigger a shutdown of further bus nodes.

After the communication port 11 has detected a "signal off" status, it checks whether a shutdown flag has been received from the communication port of another node. If a shutdown flag has been received, the communication port saves its internal status as "no fault saved", and switches its output signal off, thus bringing the communication port into a safe state. The steps of saving the internal status and switching off the output signal of the communication port may be exchanged, in some embodiments. If a shutdown flag has not been received, the communication port 11 itself has detected a critical situation, where the bus has been interrupted. In this case, the communication port 11 starts the procedure described above in which the communication port is configured as the timing master.

In general, the internal status of the communication port is preferably stored in a non-volatile memory, and may be queried after the next restart of the network or power-on of the bus node (i.e., starting the node by applying electrical power). The status information, "no fault saved" and "signal off," is used to distinguish whether a particular communication port was or was not the first port after the location where a bus fault occurred. In one alternative embodiment of the invention, the status of the communication port may be established by having a default value of "signal off" overwritten, if necessary, by "no fault saved" or otherwise.

Another embodiment of the invention relates to the case in which the network is shut down by a network node, called the power master. In such an embodiment, the communication port of the power master sets the shutdown flag, forwards the shutdown command to the other network nodes, and saves its internal status as "no fault saved". Finally, it waits the predetermined amount of time, which is necessary to forward the frames including the shutdown flag to one or more of the other network nodes and switches off its output signal. When the next communication port detects the "signal off" status, it proceeds as described above for the case of a received shutdown flag by saving its internal status as "no fault saved" and shutting its output off. In this manner, the communication ports shut down one after the other. After a shutdown is triggered by the power master, all communication ports have the status "no fault saved."

According to a further embodiment, in the case of an emergency shutdown, which may be caused by a low supply voltage or an over-temperature detected at a communication port, the signal at the output of the communication port is switched off immediately. This causes the succeeding communication port on the bus to detect a "signal off" state and to proceed as explained above by taking over the role as timing master, forwarding the shutdown flag to the other network node's communication ports and saving its internal state of "sudden signal off."

If there is only one failure at a time causing a "signal off" event, the next communication port after the location of this event will configure itself as timing master and forward the shutdown flag to the other network node's communication ports. In addition, it will save its internal state as "signal off" and shut down its output signal to trigger the "signal off" event at succeeding node's communication ports. The succeeding communication ports shut down by saving the status "no fault saved," as they previously have received the shutdown flag. This results in a safe network status with all nodes being shut down after some predetermined time. When the bus is restarted or powered on again, any node (such as a network analyzer) may read the status of the communication ports of the network nodes. Only one of the communication ports will have the internal status "signal off," while all the other communication ports have the internal status "no fault saved" (unless the network is shut down by the power master, in which case all nodes have an internal status of "no fault saved"). Accordingly, this one communication port, which succeeded the location of the "signal off" event, can be used to identify the location of the network failure. For example, if node 20 exhibits a "signal off" status, it can be determined that an event causing signal failure occurred in node 10 or in the line between nodes 10 and 20. Therefore, according to the invention, an easy identification of the location of a "signal off" event is possible. In addition to the "signal off" status, other data relevant to the event may be recorded by the network node or its communication port.

As noted above, the communication port, which is first to detect the "signal off" event, sets the shutdown flag and forwards the shutdown flag to other nodes in the network in a standard frame, a special frame or a message. In one embodiment, the frames comprise at least: a preamble for marking the beginning of a frame, a shutdown flag field, and an optional data field.

The frames generally include a predetermined number of bits. Preferably, the number of bits per frame is constant. The data field is optional and may be omitted. Furthermore, the communication port 11 is configured to receive data from the communication line. This communication port 11 generally has a frame buffer for storing frames and a decoder for disassembling the frames (or at least parts thereof). Upon receiving data, the communication port 11 may first synchronize on a preamble, if available. The communication port 11 preferably can analyze at least parts of these frames for reading the shutdown flag field.

Preferably, transmitting and receiving of the shutdown flag is done by the physical layer (according to the ISO model) of the communication port.

Figure 3:
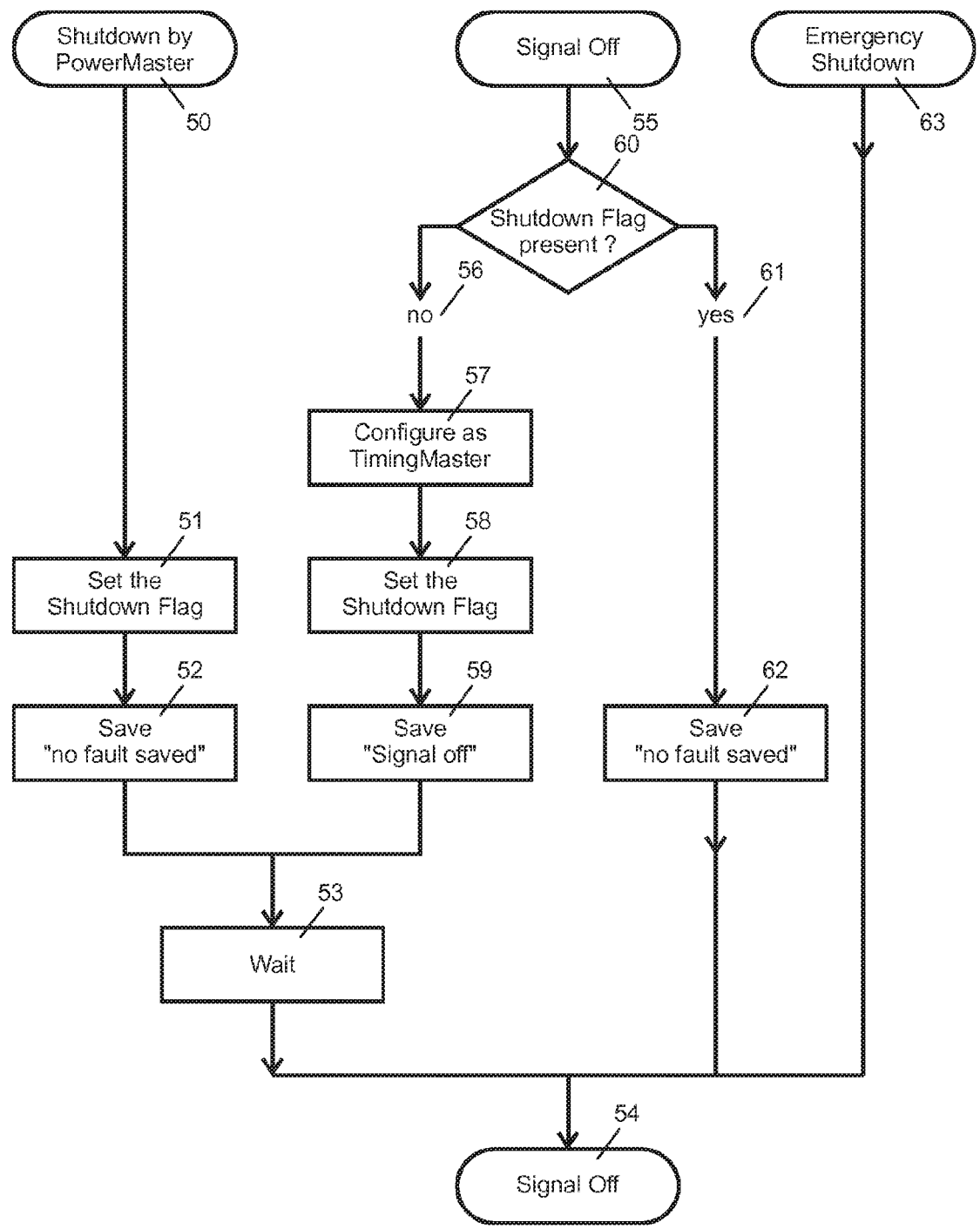
FIG. 3 shows a flowchart of the function of a communication port.

FIG. 3 is a flowchart diagram illustrating various ways in which a communication port may handle a signal failure or emergency shutdown.

When the power master shuts down the network (step 50), the power master sets the shutdown flag (step 51), which is forwarded via the network to other network nodes, and saves the internal status "no fault saved" (step 52). Finally, it waits (step 53) the amount of time necessary for the shutdown flag to be distributed to the other nodes, and after that, shuts its own signal off (step 54). When this occurs, no more data is transmitted over the bus.

When a "signal off" condition is detected by a communication port not designated as the power master (step 55), which may arise when a missing input signal is detected at the input of the communication port, the communication port checks whether a shutdown flag is already present (step 60). A shutdown flag would be present if it had previously been received over the network and preferably had been stored in the communication port. If a shutdown flag is not present (step 56), the "signal off" condition has occurred immediately before the communication port. When this occurs, the communication port is configured as timing master (step 57), so that it may be the bus clock timing reference for the whole bus. Next, the communication port sets the shutdown flag (step 58), which is forwarded over the bus to the other network nodes, saves its internal state as "signal off" (step 59), and waits (step 53) a predetermined amount of time before switching off its signal (step 54).

If after a "signal off" is detected (step 55), the communication port determines that a shutdown flag is present (step 61), the communication port saves its internal state as "no fault saved" (step 62) and switches its signal off (step 54).

In the case of an emergency shutdown (step 63), the communication port immediately switches off its signal (step 54).

The various methods mentioned above are explained in more detail below.

According to one embodiment, a method for shutting down a communication port of a network node, a network node or even a whole network includes the following steps:

A1) detecting a "signal off" condition, which may be a failure to receive an input signal, and proceeding with the following steps only if a signal off condition has been detected.

A2) configuring a communication port as timing master,

A3) setting the shutdown flag and forwarding the shutdown flag over the network, A4) waiting a predetermined time, and A5) switching the output signal off.

In addition, the method may further include saving the status "signal off" any time after step A1.

Preferably, the method may further include the step of checking whether there a shutdown flag present, wherein the step of checking is performed immediately after a "signal off" event has been detected (step A1). If a shutdown flag is present, a "no fault saved" status is saved and processing is continued with step A5. In some embodiments, steps A2, A3, and A4 may be exchanged in order. It is only necessary to configure the communication port as timing master (step A2) before setting and forwarding the shutdown flag (step A3). In most cases, the waiting step (step A4) should take place after forwarding the shutdown flag (step A3).

In another embodiment, the method may include the steps of:

A6) saving the internal status "no fault saved," and

A7) switching the output signal off.

instead of the steps A2 to A5, if the communication port determines that a shutdown flag has been received. In some cases, the order of A6 and A7 may be reversed.

A further embodiment of the method to be performed by a power master communication port, may include the steps of:

B1) setting the shutdown flag and forwarding the shutdown flag over the network, B2) waiting a predetermined time, and B3) switching the output signal off In addition, the method performed by the power master may include the step of saving the status "no fault saved" anytime.

A communication port having the function of the power master starts to shut down the network by the sequence denoted in steps B1 to B3. As used herein, a "power master" device is a network node, which controls the power status (e.g., power on, power off, idle, etc.) of the individual network nodes, and preferably, of the whole network. In the case that the network is shutdown by the power master, the nodes following the power master will detect a "signal off" condition and receive the shutdown flag before proceeding with steps A6 and A7.

Another embodiment of the method relates to the case in which an emergency shutdown has to be performed. In such an embodiment, the signal of the communication port is immediately switched off This causes the succeeding node's communication port (i.e., the timing master) to detect a "signal off" condition and proceed according to steps A1 to A5. The communication ports of nodes succeeding that node also detect the "signal off" condition and receive the shutdown flag before proceeding with steps A6 and A7.

It will be appreciated to those skilled in the art having the benefit of this disclosure that this invention is believed to provide communication systems having a plurality of network nodes, communication ports of such network nodes and methods for handling a "signal off" event or indication of a network shutdown within the communication port of a network node.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

The invention claimed is:

1. A communication port for a node in a communication network having a plurality of nodes coupled together via a bus, the communication port having an input for receiving data, an output for transmitting data and means for detecting a signal off condition at the input, and wherein the communication port is configured for: detecting a signal off condition; after the signal off condition has been detected, checking whether a shutdown flag has been received, wherein: if the shutdown flag is not received, the communication port is further configured for performing the steps of: saving its internal status "signal off"; configuring itself as timing master for the bus; setting the shutdown flag, which is forwarded over the bus to the communication port of a subsequent node; waiting a predetermined amount of time; and switching off an output signal associated with the communication port; and if the shutdown flag is received, the communication port is further configured for performing the steps of: saving its internal status "no fault saved;" and switching off the output signal associated with the communication port.

2. The communication port according to claim 1, wherein if the communication port is a power master, the communication port is instead configured for performing the steps of: setting the shutdown flag, which is forwarded over the bus; saving its internal status the "no fault saved"; waiting the predetermined time; and switching off an output signal associated with the communication port.

3. The communication port according to claim 1, wherein in the case an emergency shutdown has to be performed, the communication port is immediately configured for switching its output signal off.

4. The communication port according to claim 1, wherein the communication port is further configured to generate frames, and at least partly analyze frames received from other nodes among the plurality of the nodes, wherein said generated and received frames comprise at least: a preamble for marking the beginning of a frame; and a shutdown flag field.

5. The communication port according to claim 1, wherein the plurality of nodes are connected together via a ring bus network.

6. A method for shutting down a communication port of a network node, wherein the method is performed by the communication port and comprises: A0) detecting a "signal off" event; A1) checking whether a shutdown flag is present, wherein: if the shutdown flag is not present, the method performed by the communication port further comprises: A2) configuring the communication port as timing master; A3) setting the shutdown flag and forwarding the shutdown flag over a network to a subsequent network node; A4) waiting a predetermined amount of time; A5) switching off an output signal associated with the communication port off; and A6) at any time after step A1, saving an internal status of the communication port as "signal off;" and if the shutdown flag is present, the method performed by the communication port further comprises: A7) saving the internal status of the communication port as "no fault saved;" and A8) switching off the output signal associated with the communication port.

7. The method according to claim 6, wherein if the communication port is a power master, the method performed by the communication port comprises the following steps instead of steps A0-A8: B1) setting the shutdown flag and forwarding the shutdown flag over the network; B2) saving the internal status of the communication port as the "no fault saved;" B3) waiting the predetermined amount of time; and B4) switching off the output signal associated with the communication port.

8. A communication system having a plurality of nodes coupled together via a bus, wherein each node comprises a communication port having an input for receiving data, an output for transmitting data and means for detecting a signal off condition at the input, and wherein the communication port is configured for: detecting a signal off condition; after the signal off condition has been detected, checking whether a shutdown flag has been received, wherein: if the shutdown flag is not received, the communication port is further configured for: saving an internal status as "signal off"; configuring itself as timing master for the bus; setting the shutdown flag, which is forwarded over the bus to a communication port of a subsequent node; waiting a predetermined amount of time; and switching off an output signal associated with the communication port; and if the shutdown flag is received, the communication port is further configured for: saving an internal status as "no fault saved;" and switching off the output signal associated with the communication port.

9. The communication system according to claim 8, wherein if the communication port is a power master, the communication port is instead configured for: setting the shutdown flag, which is forwarded over the bus to the subsequent node; saving the internal status as the "no fault saved"; waiting the predetermined time; and switching off the output signal associated with the communication port.

10. The communication system according to claim 8, wherein in the case of an emergency shutdown, the communication port is immediately configured for switching its output signal off.

11. The communication system according to claim 8, wherein the communication port is further configured to generate frames, and at least partly analyze frames received from other nodes among the plurality of nodes, wherein said generated and received frames comprise at least: a preamble for marking the beginning of a frame; and a shutdown flag field.

12. The communication port according to claim 8, wherein the plurality of nodes are connected together via a ring bus network.

* * * * *

UNITED STATES PATENT AND TRADEMARK OFFICE
CERTIFICATE OF CORRECTION

| | | |
|---|---|---|
| PATENT NO. | : 8,279,751 B2 | Page 1 of 1 |
| APPLICATION NO. | : 12/752291 | |
| DATED | : October 2, 2012 | |
| INVENTOR(S) | : Kerber et al. | |

It is certified that error appears in the above-identified patent and that said Letters Patent is hereby corrected as shown below:

Claim 6 col. 9 line 16: delete "off" after the phrase "communication port."

Signed and Sealed this
Twelfth Day of February, 2013

Teresa Stanek Rea
*Acting Director of the United States Patent and Trademark Office*